(No Model.)
A. MAUL.
ANIMAL TRAP SETTER.
No. 446,921. Patented Feb. 24, 1891.
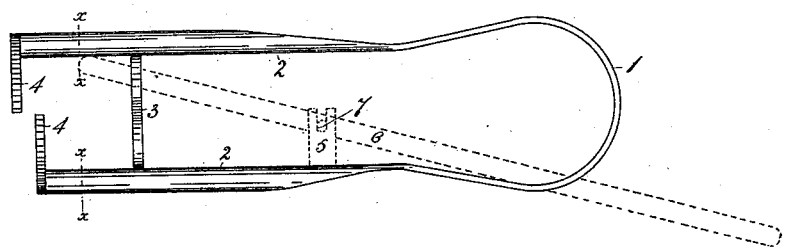
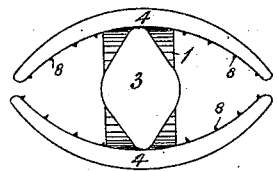
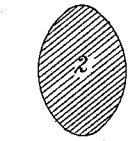
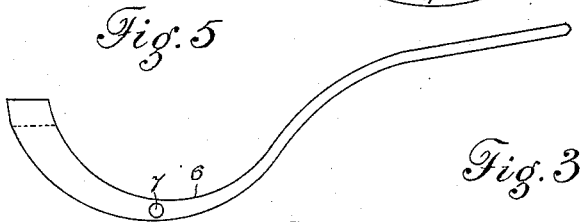
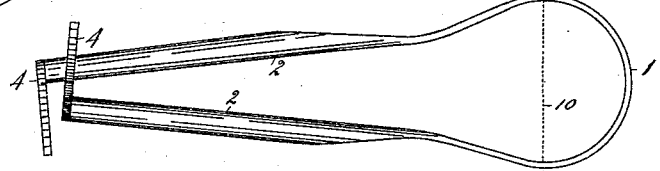
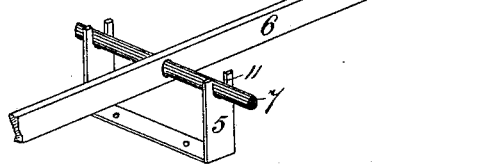
WITNESSES:
G. J. Rollander
W. H. McConnell
INVENTOR
Alvin Maul
BY A. J. O'Brien
ATTORNEY.
THE NORRIS PETERS CO., PHOTO-LITHO., WASHINGTON, D. C.

UNITED STATES PATENT OFFICE.

ALWIN MAUL, OF PINE GROVE, COLORADO.

ANIMAL-TRAP SETTER.

SPECIFICATION forming part of Letters Patent No. 446,921, dated February 24, 1891.

Application filed June 9, 1890. Serial No. 354,834. (No model.)

*To all whom it may concern:*

Be it known that I, ALWIN MAUL, a citizen of the United States, residing at Pine Grove, in the county of Jefferson and State of Colorado, have invented certain new and useful Improvements in Animal-Traps; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a novel and improved form and construction of animal-traps.

Much difficulty has been hitherto experienced by persons trapping for animals, and more especially for those animals accustomed to burrow in the ground and to live in burrows, hollow logs, &c. Among the chief difficulties associated with such trapping may be mentioned the difficulty of getting the trap in such position that the animal cannot avoid it in escaping from his hole or burrow; in properly concealing the trap so that it will not frighten the intended victim; in providing a trap which shall kill its victim outright or very soon after its capture, and thus avoid all danger of getting loose; in getting a trap which may be so set that it will not be more likely to catch something else than the victim intended, and numerous other difficulties, all of which are well known to the experienced hunter and trapper. For the obviation of such difficulties many and ingenious devices have been provided, all of which come short of accomplishing the purpose intended and most of which relate more or less closely to the old-styled steel trap.

The object, therefore, of my invention is to provide a trap of the class stated which shall be so constructed and arranged that it may be set in such position that it is almost if not quite impossible for an animal to escape from his burrow without becoming its captive; a trap which may be so set as to be tripped with more or less difficulty and regulated according as the trapper may deem adapted to the game intended, and which shall be of simple construction, economical in cost, reliable and durable in use, and efficient for the purpose intended.

In carrying out my invention I use, properly, a U-shaped spring, the arms of which are convergent, meeting at their free extremities. The bow of this spring is so made as to allow the extremities of the arms to be sprung apart for any suitable distance—say, until they are parallel or approximately parallel. To the free extremity of each arm is rigidly secured or made integral therewith a curved cross-piece or jaw, the general contour of said jaws being such that when the arms are sprung apart there shall be a circular or elliptical opening or mouth between them, through which the victim must pass to leave his hole or burrow. These arms are held or propped apart by a brace, which is so adjusted that it may be displaced and the trap tripped by a light or heavy touch, according to the game to be taken in.

To these ends my invention consists in the features and arrangements more particularly hereinafter described and claimed.

In the accompanying drawings is illustrated an embodiment of my invention, wherein—

Figure 1 is a side elevation of the trap set; Fig. 2, a front view of the same; Fig. 3, a side view of the device closed; Fig. 4, a perspective view of a suitable lever for setting large traps; Fig. 5, a modified form of said lever; Fig. 6, a cross-section on line $x\, x$, Fig. 1.

Referring now to these views, the reference-numeral 1 designates the bow or U-shaped spring of the trap, and is made of any suitable resilient material, preferably steel. Continuous with each end of said spring and forming a portion thereof are the arms 2, said arms being made large enough and of such shape as to be rigid, the inner surfaces thereof being oval, rounded, or convexed, as shown in the drawings in Fig. 6.

Rigidly secured to or formed integral with the free extremity of each of said arms 2 are the arched or crescent-shaped pieces or jaws 4, as seen in Fig. 2 of the drawings. These jaws are made large enough and of such contour as to form a sufficiently large opening, when the device is set, for the head of the animal it is intended to catch to pass therethrough. Lugs or prods 8 may be secured to or formed integral with jaws 4 and project inwardly therefrom, said prods being adapted to pierce into and aid in holding and killing the animal caught.

It will be seen from the drawings that arms 2 should be of unequal length, so as to allow jaws 4 to pass each other when the trap is tripped and so press harder against the animal than if crescent-shaped pieces 4 4 should rest upon each other. Arms 2 are held or propped apart by brace 3, which, though preferably elliptical or diamond-shaped, may be of any desired contour. It will be seen that if arms 2 are braced apart by piece 3 the rounded points or tips thereof being in contact with the inner convex or oval surfaces of the arms, but little pressure or a slight touch will be necessary to trip the trap, the force of the touch or the amount of pressure required to trip the same being regulated by the position of said rounded tips of pieces 3—as, for instance, it will require less pressure to trip the trap when the point of support on which one of arms 2 is held from the other is a little to one side of the center than if it were in the center of the arm. Furthermore, the fact must not be overlooked that by having piece 3 made of the shape herewith illustrated, the animal will have greater difficulty in passing therearound than if said piece were of any other contour, for it is well known that the animal will not purposely run against or even brush said piece, the purpose of my invention being to provide a trap which may be so placed that the only possible egress from the burrow or hole shall be therethrough. It will, however, be understood that my improved trap is not to be confined to trapping of this class, since it may be baited and set for the same purpose and in similar locations to those of ordinary traps, the trap and bait being so placed that the animal must pass through its jaws in order to secure the bait, and in securing the same shall trip the trap.

In Fig. 4 is illustrated a device which may be used in setting large traps made after my improved form, said device consisting of a lever 6, fulcrumed on pin or bar 7, which is pivoted in support 5, as at 11. The application of this device is illustrated in Fig. 1, wherein it is shown in dotted lines, support 5 resting against one of arms 2, while lever 6 is used to spring the other arm therefrom, when a piece 3 may be placed between them and the trap set, notch 12 engaging arm 2. (See Fig. 5.)

The trap may be secured to any suitable stay, as a post, log, or stone, by means of a chain or other suitable means.

Having thus described my invention, what I claim is—

The combination, with an animal-trap, of a device for setting the same, said device consisting of a lever provided with a suitable fulcrum and a support for the fulcrum, said support resting upon the lower arm of the trap, while one arm of the lever engages the upper arm of the trap, whereby the jaws are sprung apart preparatory to inserting the trigger, substantially as described.

In testimony whereof I affix my signature in presence of two witnesses.

ALWIN MAUL.

Witnesses:
WM. MCCONNELL,
FRED W. FELDWISCH.